United States Patent [19]
Takemoto

[11] Patent Number: 5,301,075
[45] Date of Patent: Apr. 5, 1994

[54] HARD DISK DRIVE HAVING A SHIELDING STRUCTURE AGAINST ELECTROMAGNETIC NOISE

[75] Inventor: Takashi Takemoto, Sagamihara, Japan

[73] Assignee: TEAC Corporation, Japan

[21] Appl. No.: 889,487

[22] Filed: May 27, 1992

[30] Foreign Application Priority Data

May 31, 1991 [JP] Japan .................. 3-040665[U]

[51] Int. Cl.$^5$ ............................................. G11B 33/14
[52] U.S. Cl. ................................. 360/97.02; 360/97.01
[58] Field of Search ........................... 360/97.01, 97.02

[56] References Cited

U.S. PATENT DOCUMENTS

| | | | |
|---|---|---|---|
| 4,504,879 | 3/1985 | Toldi et al. ............. | 360/105 |
| 4,769,733 | 9/1988 | Freeman et al. .......... | 360/133 |
| 5,021,905 | 6/1991 | Sleger .................. | 360/97.02 |
| 5,025,335 | 6/1991 | Stefansky ............... | 360/902 |

FOREIGN PATENT DOCUMENTS 0279586 12/1987 Japan .
9209072 5/1992 World Int. Prop. O. ....... 360/97.01

Primary Examiner—John H. Wolff
Assistant Examiner—George J. Letscher
Attorney, Agent, or Firm—Andrus, Sceales, Starke & Sawall

[57] ABSTRACT

A hard disk drive has a configuration in which a metal cover, which is fitted with a hard disk, is fitted on a metal base by being screwed at a plurality of places, with a gasket being sandwiched in between the metal base and the metal cover. First protuberances are provided on the base on both sides of each hole for accepting a screw, there being one protuberance on one side and another on another side of said screw hole, second protuberances being provided on the cover at positions that are opposite to said first protuberances, and such that the first protuberances and the second protuberances are in pressured contact with each other on both sides of each screw portion, when the cover is fixed onto the base.

6 Claims, 11 Drawing Sheets

$$\text{NOISE RATIO} = \frac{B}{A} \times 100$$

HARD DISK DRIVE HAVING A SHIELDING STRUCTURE AGAINST ELECTROMAGNETIC NOISE

BACKGROUND OF THE INVENTION

The present invention relates to a hard disk drive, and more specifically to a shielding structure of a hard disk drive.

A hard disk drive is generally used within a computer, wherein electromagnetic noise is abundant.

Therefore, it is required that a hard disk drive be of a structure that is resistant to outside electromagnetic noise.

FIGS. 1 and 2 show a conventional hard disk 10.

The hard disk drive 10 is configured such that to a die-cast aluminum base 14 fitted with a hard disk 12, an actuator 13, and other parts, an die-cast aluminum cover 16 is fixed by means of screws 17, with a gasket 15 sandwiched between the cover 16 and the base 14.

The gasket 15, made of foam resin, is an insulator.

In threaded corner portions of the base 14 and corresponding portions of the cover 16 are formed flat surface portions $18_{-1} - 18_{-4}$ and $19_{-1} - 19_{-4}$ respectively.

The cover 16 is fixed in such a way that the flat surface portions $18_{-1} - 18_{-4}$ are in contact with the corresponding flat surface portions $19_{-1} - 19_{-4}$.

The base 14 is grounded.

The base 14, the cover 16, the gasket 15, and the screws 17 constitute a shielding structure.

From a viewpoint of preventing invasion of electromagnetic noise, the shielding structure of the hard disk drive 10 includes slit windows 20, 21, 22, and having a width of W and a length of $L_1$ or $L_2$, as shown in FIGS. 2 and 3.

As regards a slit window in general, the maximum length of the straight portion determines the amount of electromagnetic noise invasion; the longer the straight portion, the larger the amount of electromagnetic noise invasion.

Accordingly, with the above construction, there is a potential that, of the windows 20, 21, 22, and 23, the slit windows 20 and 22, which are larger than the other two, present a problem.

As shown in FIG. 4 in an exaggerated manner, with the above construction, one-sided contact (i.e. contact not on the entire flat surfaces 18 and 19) could be created between the flat surface portion $18_{-1}$ and the flat surface portion $19_{-1}$, and also between the flat surface portion $18_{-2}$ and the flat surface portion $19_{-2}$.

One possible result of this incomplete contact is that a slit window 20A of a length $L_2$, longer than the normal length $L_1$ could be created, thus causing the set to be more susceptible to electromagnetic noise invasion.

Another possible result is that electric contact between the cover 16 and the base 14 could be insufficient.

For these two reasons, the shielding structure of the conventional hard disk drive 10 has a disadvantage in that it has a potential of not working to the fullest of its electromagnetic noise invasion prevention capability, thereby lacking in reliability.

SUMMARY OF THE INVENTION

Accordingly, a general object of the present invention is to provide a novel and useful hard disk drive in which above-mentioned disadvantages are eliminated.

Another object of the present invention is to provide a hard disk drive which is configured such that protuberances provided on a cover are in pressured contact with protuberances on a base on both sides of a screw, along the periphery of the cover, which screw fixes the cover onto the base.

In accordance with the present invention, slit windows formed between the base and the cover can be made shorter, and shielding effect against electromagnetic noise invading the hard disk drive is improved.

BRIEF DESCRIPTION OF THE DRAWINGS

Other objects and further features of the present invention will be apparent from the following description given with the drawings, in which.

DESCRIPTION OF PREFERRED EMBODIMENTS

Figure 1:
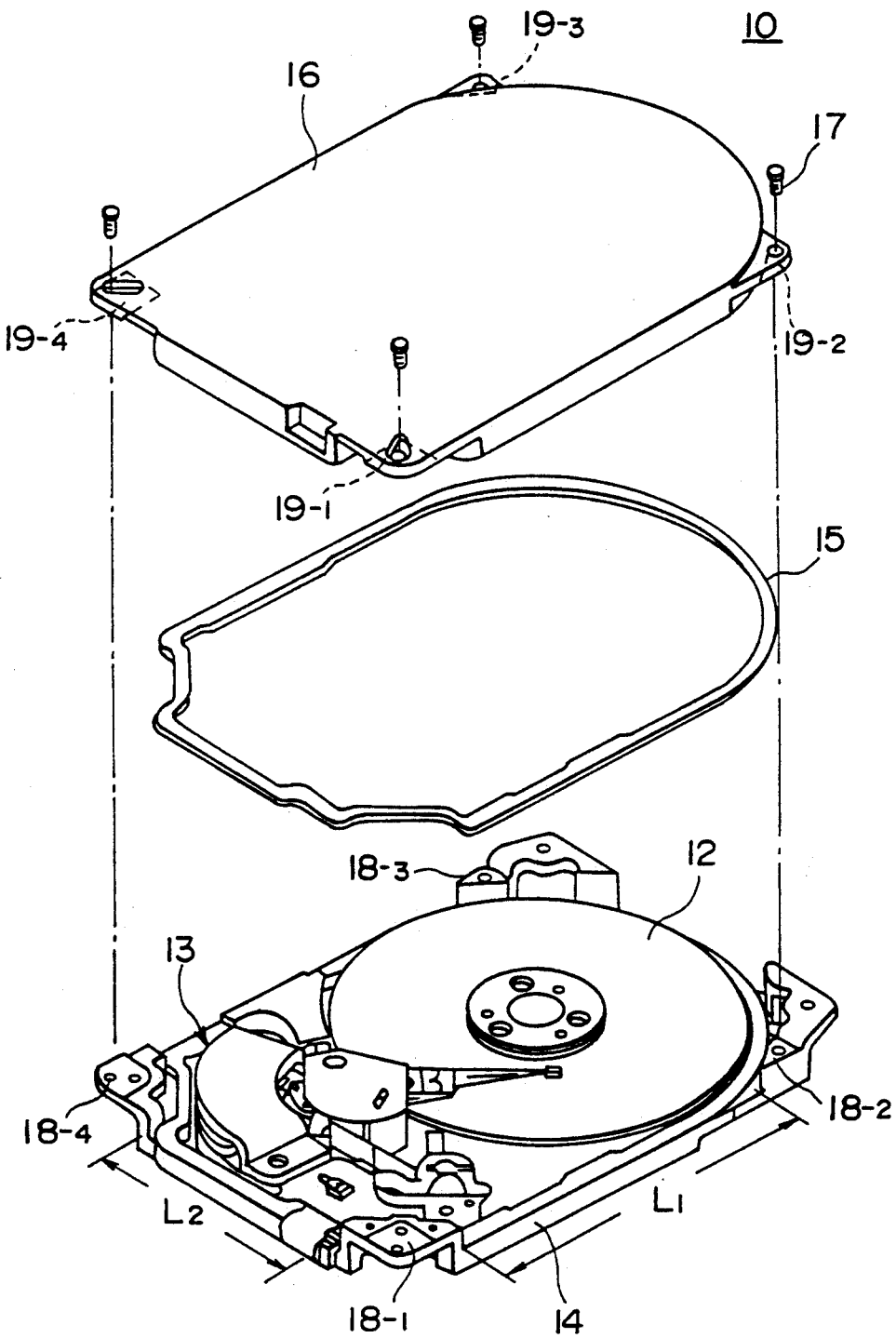
FIG. 1 is an exploded oblique view of an example of a conventional hard disk drive.

A description will be given below of a hard disk drive 30 of an embodiment of the present invention, by referring to FIGS. 5 through 14.

In the figures, parts that correspond to the parts shown in FIGS. 1 through 4 are given the same reference notation from figure to figure.

A base 33 is of die-cast aluminum and is painted. A hard disk 12 and a actuator 13 are assembled onto the base 33.

A cover 31 is of die-cast aluminum and is painted on its entirety.

The cover 31 is fitted onto the base 33 so as to cover the hard disk 12 and the actuator 13.

The cover 31 is secured onto the base 33 at a total of 6 points, by means of screws $34_{-1} - 34_{-6}$ at the centers of the longitudinal side as well as at four corners.

A foam resin gasket 32 is sandwiched between the cover 31 and the base 33.

Figure 7:
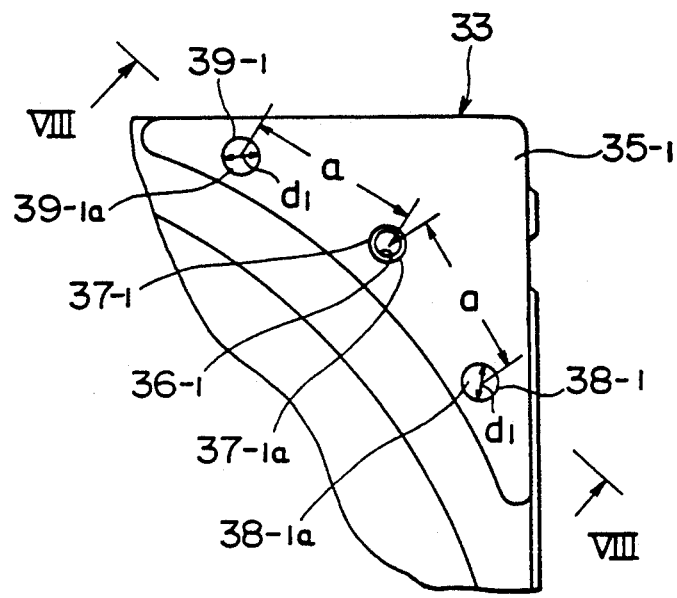
FIG. 7 is an enlarged top view of a corner portion of the base.
Figure 8:
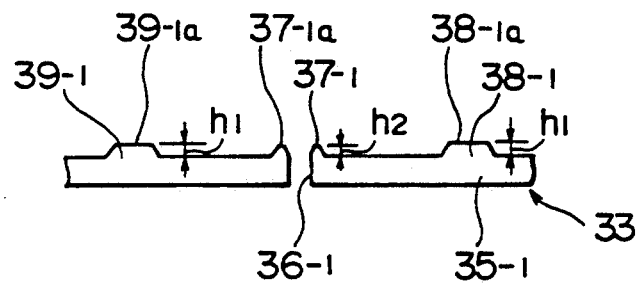
FIG. 8 is a cross-sectional view taken along a line VIII—VIII.

As shown in FIGS. 7 and 8, on a corner portion $35_{-1}$ of the base 33, a threaded hole $36_{-1}$ is formed in the center, a first annular raised portion $37_{-1}$ encircling the threaded hole $36_{-1}$ is formed, and first protuberances $38_{-1}$ and $39_{-1}$ of flattened column shapes are formed to the right and left of the threaded hole $36_{-1}$ along the periphery of the base 33; the protuberances being equidistant from the threaded hole $36_{-1}$, the distances therefrom being a maximum of a.

The annular raised portion $37_{-1}$, and the protuberances $38_{-1}$ and $39_{-1}$ are formed such that their topsides are face-milled since high precision is required in their height. As a result of this, a topside $37_{-1a}$ of the annular raised portion $37_{-1}$, and topsides $38_{-1a}$ and $39_{-1a}$ of the protuberances $38_{-1}$ and $39_{-1}$ are provided with paint removed and aluminum exposed.

Figure 5:
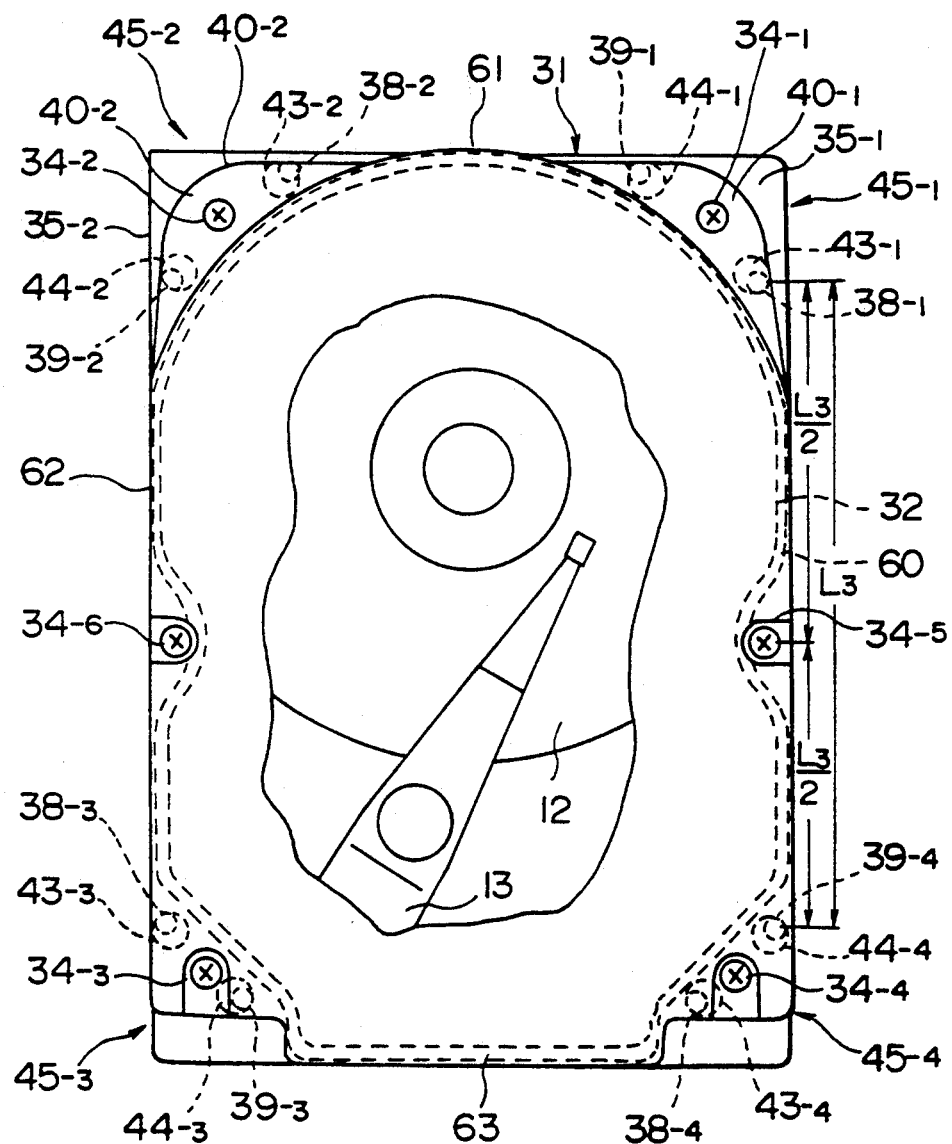
FIG. 5 is a top view of an embodiment of the hard disk drive of the present invention, with a part of the cover shown transparent.
Figure 6:
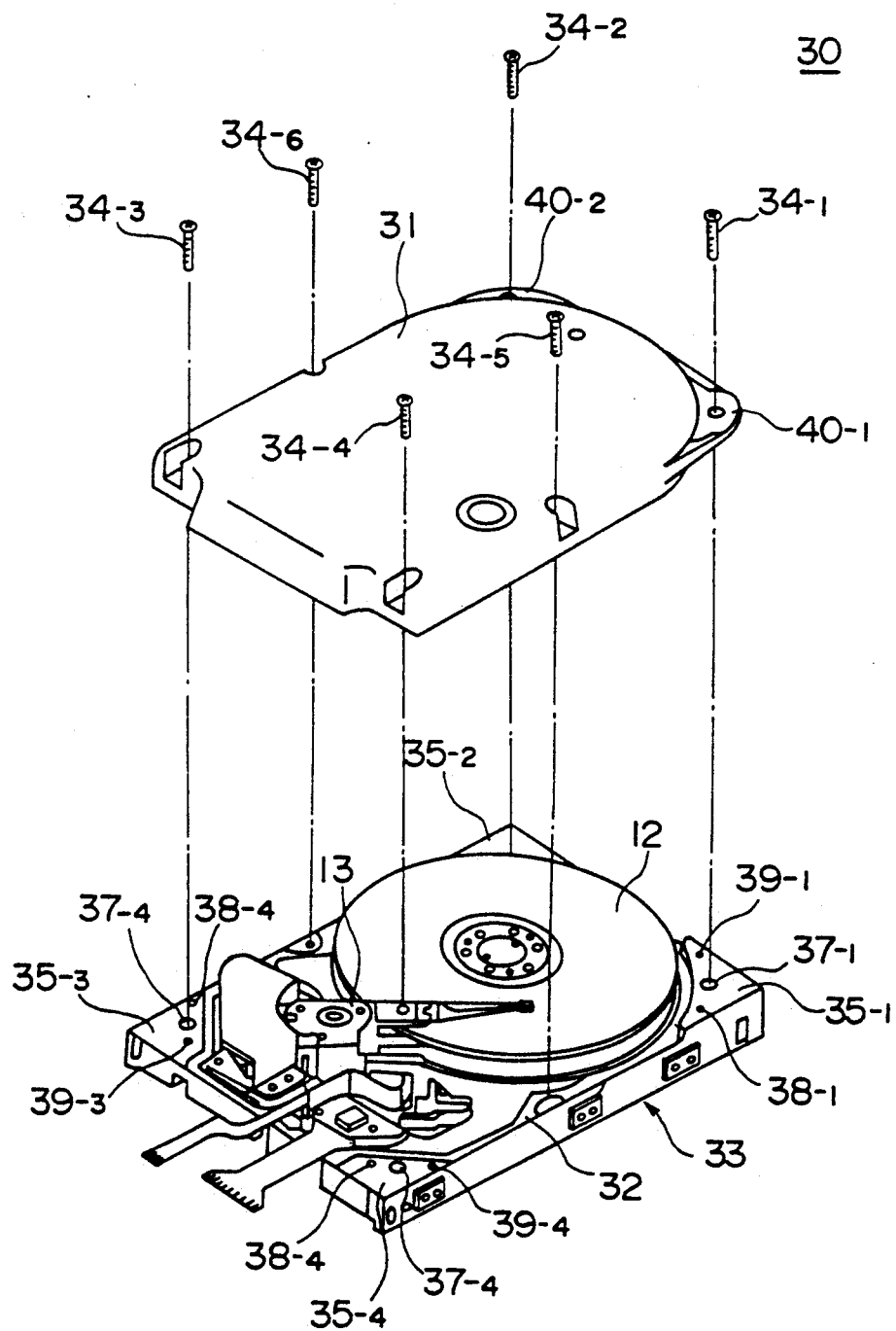
FIG. 6 is an exploded oblique view of the hard disk drive of FIG. 5.
Figure 13:
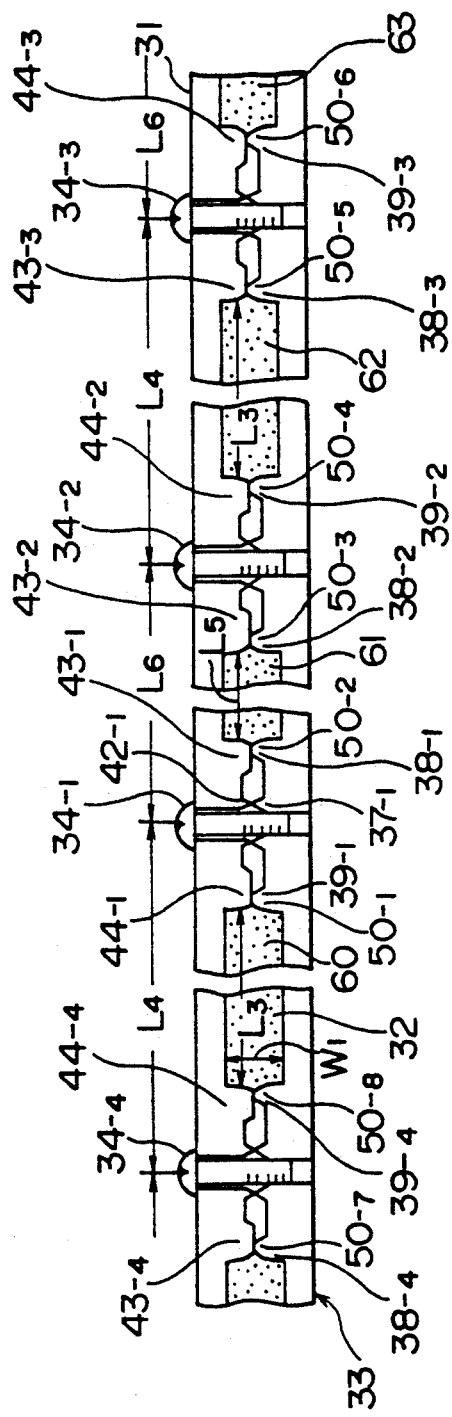
FIG. 13 is an expansion view of a peripheral shielding structure of the hard disk drive of FIG. 5.

As shown in FIGS. 5 and 6 and also in FIG. 13, on the other corner portions $35_{-2} - 35_{-4}$ of the base 33, threaded holes $36_{-2} - 36_{-4}$, first annular raised portions $37_{-2} - 37_{-4}$, and first protuberances $38_{-2} - 38_{-4}$ and $39_{-2} - 39_{-4}$ are formed, in the same way as on the corner portion $35_{-1}$.

Figure 9:
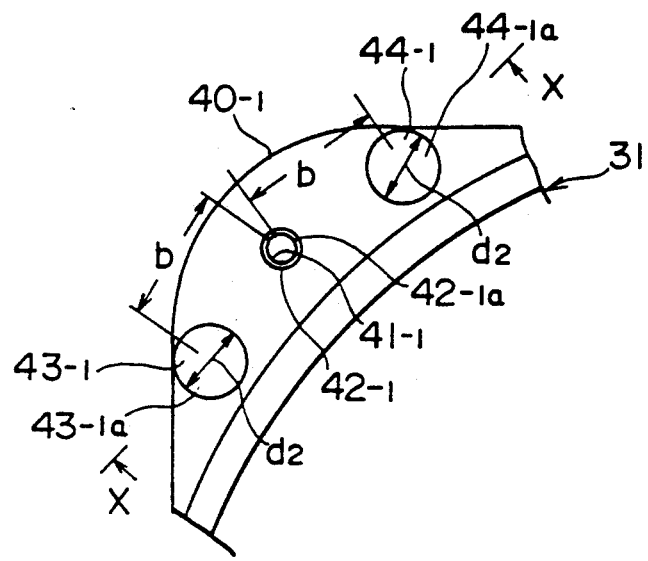
FIG. 9 is a top view illustrating a corner portion of the cover upside down.
Figure 10:
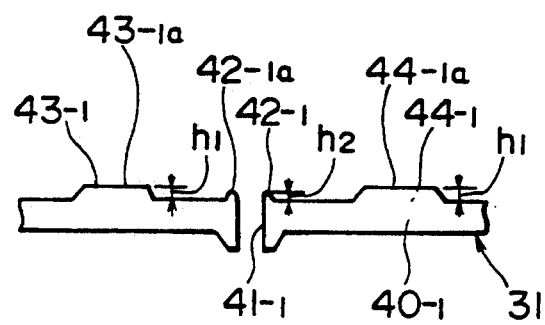
FIG. 10 is a cross-sectional view taken along a line X—X of FIG. 9.

On a corner portion $40_{-1}$ of the cover 31, which is shown turned upside down in FIGS. 9 and 10, a hole $41_{-1}$ is formed in the center; a second annular raised portion $42_{-1}$ encircling the hole $41_{-1}$ is formed, and second protuberances $43_{-1}$ and $44_{-1}$ of flattened column shapes are formed to the right and left of the hole $41_{-1}$ along the periphery of the cover 31, the protuberances being equidistant from the hole $41_{-1}$, the distances therefrom being a maximum of b.

The annular raised portion $42_{-1}$, and the protuberances $43_{-1}$ and $44_{-1}$ are formed such that their topsides are face milled since high precision is required in their height. As a result of this, a topside $42_{-1a}$ of the annular raised portion $42_{-1}$, and topsides $43_{-1a}$ and $44_{-1a}$ of the protuberances $43_{-1}$ and $44_{-1}$ are provided with paint removed and aluminum exposed.

As shown in FIGS. 5 and 13, on the other corner portions $40_{-2} - 40_{-4}$ of the cover 31, holes $41_{-2} - 41_{-3}$, second annular raised portions $42_{-2} - 42_{-4}$, and second protuberances $43_{-2} - 43_{-4}$ and $44_{-2} - 44_{-4}$ are formed.

As shown in FIGS. 7 and 9, the relationship between a diameter $d_1$ of the protuberances $38_{-1}$ and $39_{-1}$, and a diameter $d_2$ of the protuberances $43_{-1}$ and $44_{-1}$ is such that $d_1 < d_2$.

The distances a and b are such that $a > b$, where a is approximately equal to $$b + \frac{d_2}{2}.$$

As shown in FIGS. 8 and 10, the heights $h_1$ of the protuberances $38_{-1}$, $39_{-1}$, $43_{-1}$, and $44_{-1}$ are approximately the same. The heights $h_2$ of the annular raised portions $37_{-1}$ and $42_{-1}$ are somewhat smaller than the heights $h_1$.

Figure 11:
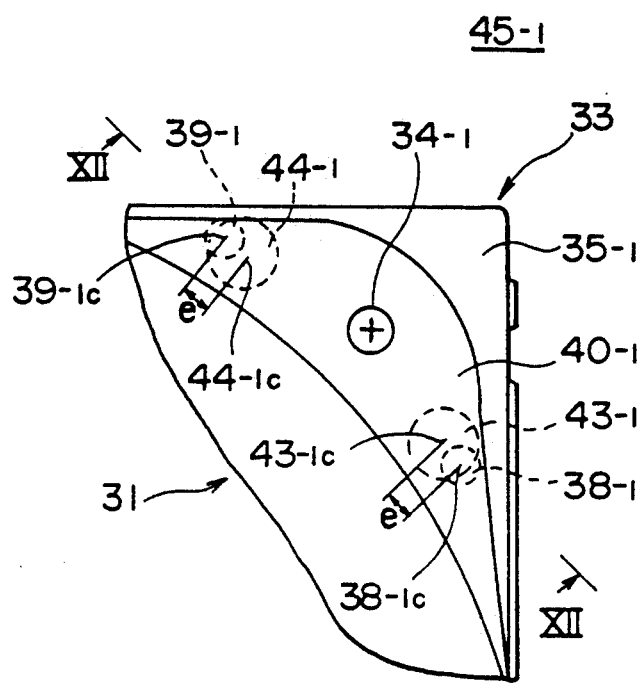
FIG. 11 is an enlarged view illustrating a corner portion shown in FIG. 5.
Figure 12:
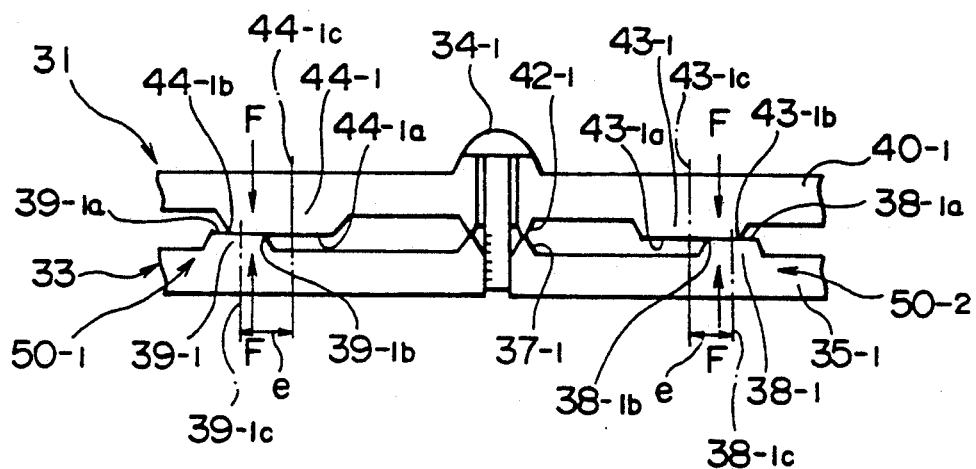
FIG. 12 is an enlarged cross-sectional view taken along a line XII—XII of FIG. 11.

A corner portion $45_{-1}$ of the hard disk drive 30 is shown enlarged in FIGS. 11 and 12, and a totality of the corner portions $45_{-1} - 45_{-4}$ are shown in FIGS. 5 through 13. It is shown in these figures that at the portions both to the right and left of each of the screws $34_{-1} - 34_{-4}$ along the periphery, which periphery runs through the screws $34_{-1} - 34_{-4}$ and around the hard disk drive 30, the protuberances $38_{-1} - 38_{-4}$ and $39_{-1} - 39_{-4}$ and the protuberances $43_{-1} - 43_{-4}$ and $44_{-1} - 44_{-4}$ are in pressured contact with each other, with a force F to an extent that the protuberances may even assume a semiintegrated condition, as by the two surfaces penetrating into one another (hereinafter mesh).

A description will be given of how the force F comes about.

Figure 14:
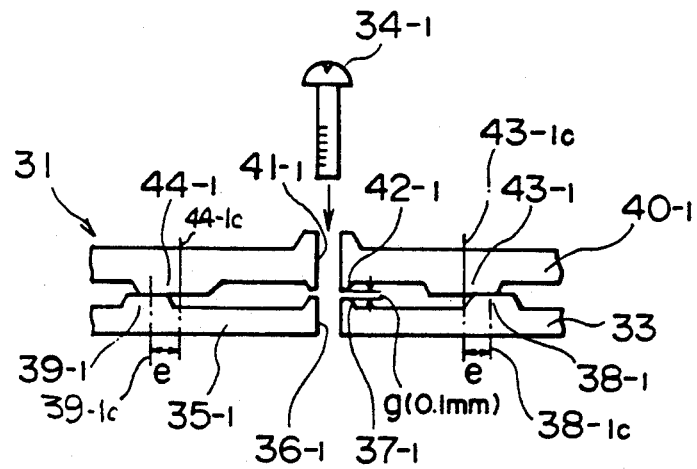
FIG. 14 is a view illustrating mounting of the cover onto the base, the two not being screwed to each other yet.

As shown in FIG. 14, an approximately 0.1 mm gap g is created between the annular raised portions $42_{-1}$ and $37_{-1}$, when the cover 31 is mounted onto the base 33 and the protuberances $43_{-1}$ and $44_{-1}$ are in contact with the corresponding protuberances $38_{-1}$ and $39_{-1}$.

Once the above positioning is achieved, the screw $34_{-1}$ is tightened.

This causes the corner portion $40_{-1}$ of the cover 31 to be deflected elastically till the gap g becomes closed; the elastic force thus generated creates the force F.

That is, the gap g determines the amount of deflection of the corner portion $40_{-1}$ of the cover 31, and the amount of this deflection determines the force F.

Since the gap g is determined with a high precision, the force F is determined with high precision.

When the gap g is closed and the annular raised portion $42_1$ is brought into contact with the annular raised portion $37_{-1}$, the screw $34_{-1}$ cannot be tightened further, thus assuring secure tightening of the screw $34_{-1}$.

A description of electromagnetic noise invasion prevention capability of the shielding structure of the hard disk drive 30 follows.

Electrical contact between the cover 31 and the base 33 is ensured, in portions $50_{-1} - 50_{-8}$ which are pressed by the protuberances $43_{-1} - 43_{-4}$ and $44_{-1} - 44_{-4}$, and also in portions pressed by the annular raised portions $37_{-1} - 37_{-4}$ and $42_{-1} - 42_{-4}$.

For each of the screwed portions secured by the screws $34_{-1} - 34_{-4}$, electrical contact is achieved in three points, resulting in smaller electrical resistance between the cover 31 and the base 33 than in the conventional hard disk drive shown in FIG. 5.

Figure 2:
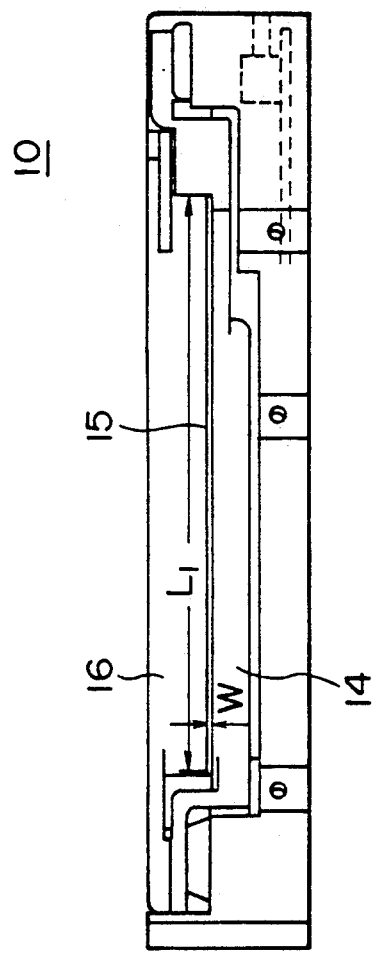
FIG. 2 is a side view of the hard disk drive of FIG. 1.
Figure 3:
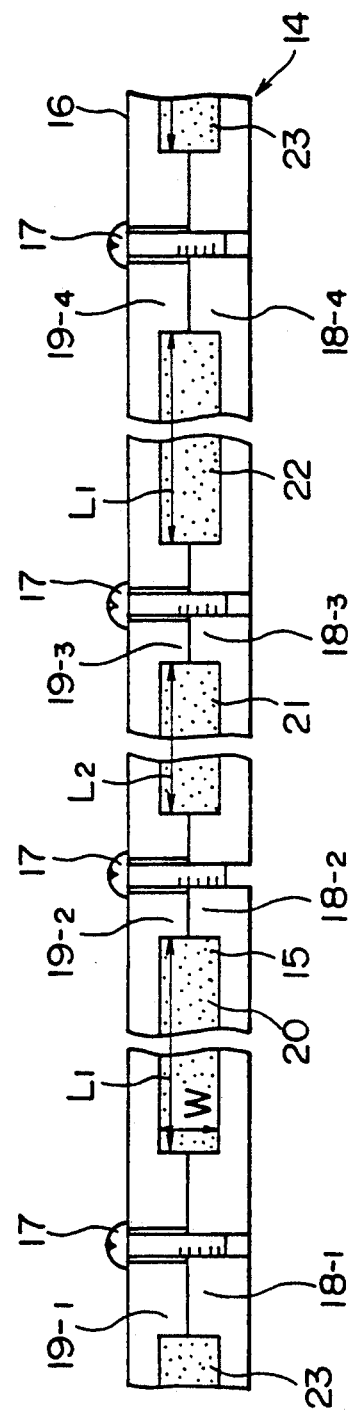
FIG. 3 is an expansion view of a peripheral shielding structure of the hard disk drive of FIGS. 1 and 2.
Figure 4:
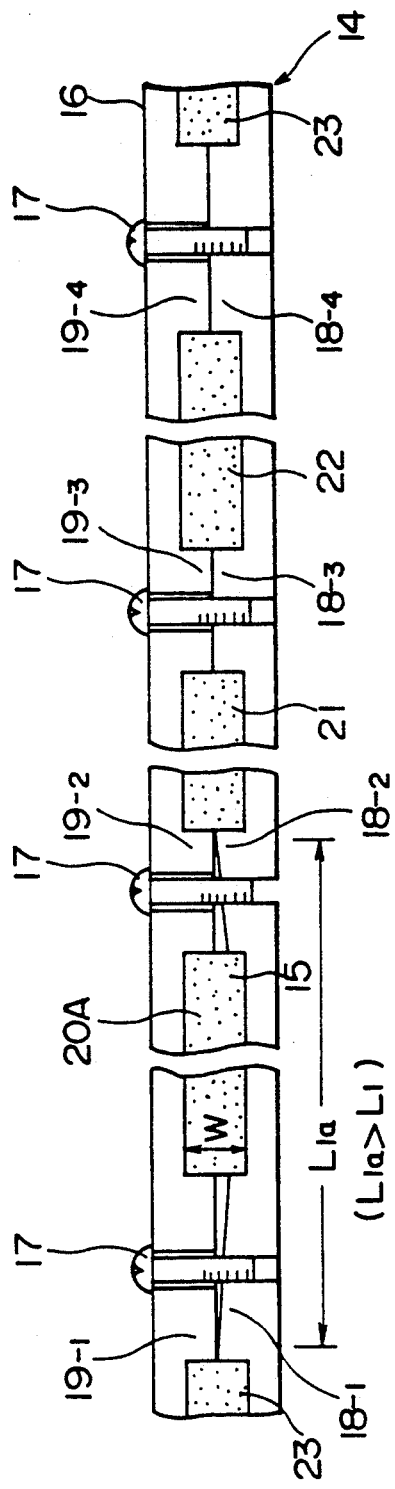
FIG. 4 is a view illustrating an example of a contact condition between a cover and a base.

For comparison with the structure of FIGS. 1 and 2, the size of a slit window through which electromagnetic noise penetrates will be examined, omitting the central screws $34_{-5}$ and $34_{-6}$ on the longitudinal sides for convenience of description.

In FIG. 13, 60 and 61 are slit windows along the longitudinal sides of the hard disk drive 2, and 62 and 63 are slit windows along the traverse sides.

It is ensured that the length $L_3$ of the slit windows 60 and 62 along the longitudinal sides is the distance between pressing portions $50_{-8}$ and $50_{-1}$, or between pressing portions $50_{-4}$ and $50_{-5}$. This length $L_3$ is guaranteed to be shorter than the length $L_4$ between the screws $34_{-1}$ and $34_{-4}$ (or the distance between the screws $34_{-2}$ and $34_{-3}$), and L- substantially shorter than the length $L_{1a}$ of FIG. 4.

It is ensured that length $L_5$ of the slit windows 62 and 63 along the lateral sides is the distance between the pressing portions $50_{-2}$ and $50_{-3}$, or between the pressing portions $50_{-6}$ and $50_{-8}$.

This length $L_5$ is guaranteed to be smaller than the distance $L_6$ between the screws $34_{-1}$ and $34_{-2}$ (and between $34_{-3}$ and $34_{-4}$).

It is apparent that $L_3 > L_5$.

Consequently, the maximum length $L_3$ of the slit windows 60-63 is substantially smaller than the maximum length $L_{1a}$ in the conventional hard disk drive, thereby causing the set to be more impervious to electromagnetic noise.

Taking the screws $34_{-5}$ and $34_{-6}$ into consideration, the slit windows 60 and 63 are split into two resulting in the length of one slit window being $L_3/2$, which is substantially small.

Accordingly, as will be described later, a hard disk drive 30 of this embodiment has better capability of preventing electromagnetic noise invasion than the conventional technology.

The centers of the protuberances $43_{-1}$–$43_{-4}$ and the protuberances $44_{-1}$–$44_{-4}$ are displaced with respect to their corresponding protuberances on the base, along the periphery of the disk drive 30.

More specifically, taking the corner portions $35_{-1}$ and $40_{-1}$ for example, the center $38_{-1c}$ of the protuberance $38_{-1}$ is farther away from the screw $34_{-1}$ than the center $43_{-1c}$ of the protuberance $43_{-1}$ by a distance e and is therefore displaced with respect to a center $43_{-1c}$ of the protuberance $43_{-1}$, as shown in FIG. 14.

In a similar way, a center $39_{-1c}$ of the protuberance $39_{-1}$ is farther away from the screw $34_{-1}$ than the center $44_{-1c}$ of the protuberance $44_{-1}$ by a distance e and is therefore displaced with respect to a center $44_{-1c}$ of the protuberance $44_{-1}$.

This results in an edge (angled portion) $38_{-1b}$ of the protuberance $38_{-1}$ being pressed against the topside $43_{-1a}$ of the protuberance $43_{-1}$ to an extent that a meshing of the surfaces of the protuberances takes place; and edge $43_{-1b}$ of the protuberance $43_{-1}$ being pressed against the topside $38_{-1a}$ of the protuberance $38_{-1}$ to an extent that a meshing of the surfaces of the protuberances takes place.

Similar conditions hold true with the protuberances $39_{-1}$ and $44_{-1}$: an edge $39_{-1b}$ of the protuberance $39_{-1}$ meshing with the topside $44_{-1a}$ of the protuberance $44_{-1}$ and an edge $44_{-1b}$ of the protuberance $44_{-1}$ meshing with the topside $39_{-1a}$ of the protuberance $39_{-1}$.

Owing to these meshings, an even smaller electrical resistance between the cover 31 and the base 33 is achieved.

With displacement e provided as above, the pressing portions $50_{-1}$ and $50_{-2}$ are located substantially away from the screw $34_{-1}$ as compared with the case where there is no displacement.

When displacement is provided, the length $L_3$ and the length $L_5$ are shorter than otherwise, with a result that the slit windows 60–63 are more impervious to electromagnetic noise.

A description of a variation of the present invention will be given below by referring to FIGS. 15 and 16.

Figure 15:
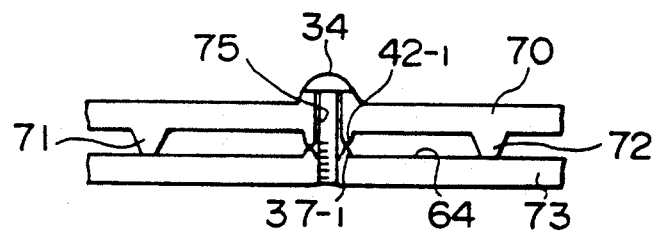
FIG. 15 is a view illustrating a variation of the present invention.

FIG. 15 illustrates a configuration in which protuberances are provided only on a cover 70.

In the cover 70, protuberances 71 and 72 are provided along the periphery of the cover 70, on both sides of a hole 75 for accepting the screw 34.

When the cover 70 is secured onto a base 73 by the screw 34, the protuberances 71 and 72 are in pressured contact with a flat surface portion 74 of the base 73, on both sides of the screw 34, along the periphery of a hard disk drive.

Figure 16:
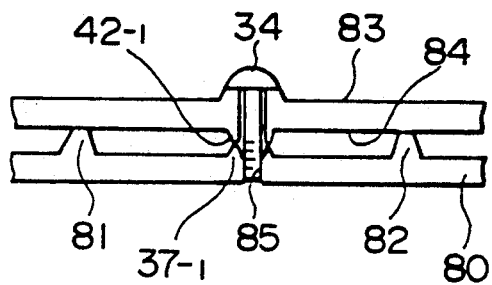
FIG. 16 is a view illustrating another variation of the present invention.

FIG. 16 illustrates a configuration in which protuberances are provided only on a base 80.

In the base 80, protuberances 81 and 82 are provided along the periphery of the base 80, on both sides of a hole 85 for accepting the screw 34.

When a cover 83 is secured onto the base 80 by the screw 34, the protuberances 71 and 72 are in pressured contact with a flat surface portion 84 of the cover 83, on both sides of the screw 34, along the periphery of a hard disk drive.

A description will be given below of a degree of improvement, in the hard disk drive 30, in the capability of preventing electromagnetic noise invasion.

Figure 17:
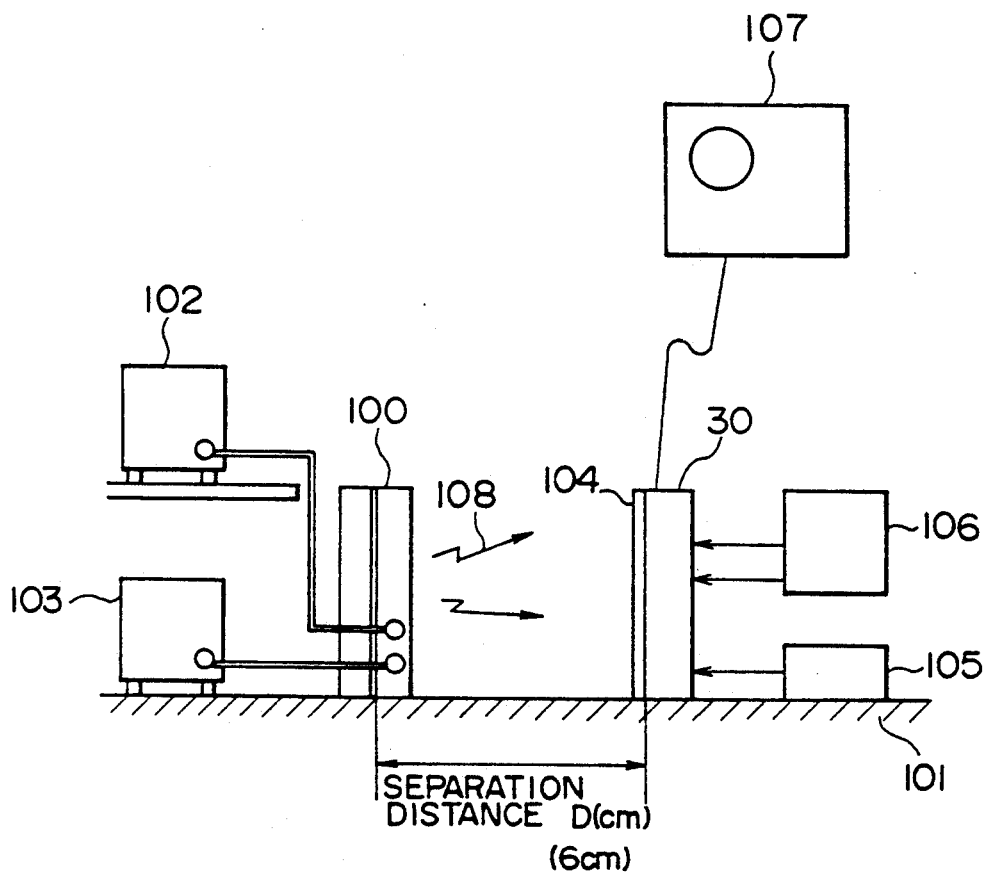
FIG. 17 is a diagram illustrating a setup of a test for measuring a noise ratio and a read error count.

FIG. 17 illustrates a test setup.

100 is a system power supply which is installed on a iron desk 101 and which is connected to an electronic load 102 and a power source 103 for the system power supply. When operated, the system power supply 100 produces electromagnetic noise.

The hard disk drive 30 is secured onto a mount board 104, is supplied with an operating voltage by an operating power source 105, and is controlled and operated by an output signal from a simulator 106.

An oscilloscope 107 is connected to the hard disk drive 30.

A distance (separation) D between the system power supply 100 and the hard disk drive 30 is set at 6 cm, for example.

A hard disk drive was prepared in which the second protuberances $38_{-1}$ –$39_{-4}$ and $39_{-1}$ –$39_{-4}$ of the fixed cover, as in FIG. 5 through FIG. 13, were removed by cutting. This hard disk drive has a configuration in which the pressing portion $50_{-1}$ –$50_{-8}$ of FIG. 13 are lacking. Hereinafter, this hard disk drive shall be called a hard disk drive without pressing portions.

A noise ratio and a read error count were measured by reading the oscilloscope 107 while the hard disk drive 30 was operated in conjunction with the system power supply 100 being operated and producing electromagnetic noise 108.

Figure 18:
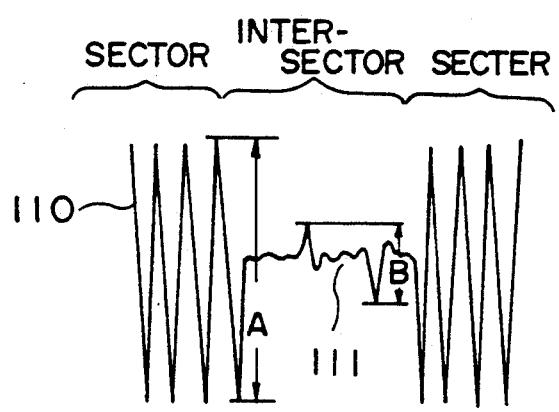
FIG. 18 is a diagram describing noise ratio.

In place of the hard disk drive 30, the hard disk drive without pressing portions was then mounted on a mounting board 104, and was operated so that noise ratio and a read error count were similarly measured.

a description of noise ratio will be given below by referring to FIG. 18.

Noise ratio is defined as the ratio of a noise level B, which is a peak-to-peak height of a noise signal 111 generated when a read operation of intersectors of a hard disk containing no signals is performed with the system power supply 100 being operated, to a signal level A, which is a peak-to-peak height of a signal 110 generated when a read operation of information written into sectors of the hard disk 12 is performed with the system power supply 100 not being operated.

The noise ratio is calculated on the basis of the signal level A and the noise level B.

Detection of read errors is performed by reading CRC codes provided separately from sectors of the hard disk 12 while the system power supply 100 is operated, and by detecting errors in read data by software means.

Specifically, when a read error is generated, a retry is automatically performed. Read errors are measured, by counting retries.

While a read error count of the hard disk drive without pressing portions was 30, a read error count of the hard disk drive 30 of the present invention was 6; that is a decrease of four fifths.

As regards noise ratio, noise ratio for the hard disk drive 30 of the present invention was lower than noise ratio of the hard disk drive without pressing portions by anywhere from several to 10 percent.

Thus, it is apparent that the elctromagnetic noise prevention capability of the hard disk drive 30 is improved in comparison with that of the hard disk drive without pressing portions.

What is claimed is:

1. A hard disk drive comprising:

a metal base fitted with a hard disk;

a metal cover which covers said hard disk;

a gasket which is sandwiched between said base and said cover; and screws for securing said cover onto said base at a plurality of places along the periphery of said cover, wherein first protuberances ($38_1$ and $39_1$) are provided on said base on both sides of each of screw holes provided for accepting each of said screws, there being one protuberance on one side at a predetermined distance apart from said screw hole and another protuberance being on another side at a predetermined distance apart from said screw hole, along the periphery of said base, wherein second protuberances ($43_1$ and $44_1$) are provided on said cover at positions so as to face said first protuberances when said cover is fitted on said base, and wherein said first and second protuberances are, when said cover is fixed on said base by said screws, in pressured contact with each other on both sides of each of said screws, along the periphery of said hard disk drive.

2. A hard disk drive as claimed in claim 1, wherein each of said first protuberances and each of said second protuberances are disposed so that, when said cover is fitted on said base, their centers ($38_{1c}$ and $43_{1c}$) are displaced with respect to each other along the periphery of said cover, a part of each of said first protuberances being in pressured contact with a part of a corresponding one of said second protuberances.

3. A hard disk drive as claimed in claim 1 wherein each of said first protuberances has a flattened column shape and each of said second protuberances has a flattened column shape with a diameter larger than that of said first protuberances.

4. A hard disk drive as claimed in claim 1 comprising:

a first annular raised portion ($37_1$) provided around each screw hole on said base for accepting one of said screws, a second annular raised portion ($42_1$) provided around each screw hole on said cover for accepting one of said screws, wherein said first annular raised portion and said second annular raised portion are of such a size that some gap is formed between said first annular raised portion and said second annular raised portion when said cover is mounted onto said base with said second protuberance being in contact with said first protuberance, and each of said screws is tightened to such an extent that said first and second annular raised portions are in pressured contact with each other.

5. A hard disk drive comprising:

a metal base fitted with a hard disk;

a metal cover which covers said hard disk;

a gasket which is sandwiched between said base and said cover; and screws for securing said cover onto said base at a plurality of places on the periphery of said cover, wherein protuberances (71 and 72) are provided on said cover on both sides of each screw hole provided for accepting each of said screws, there being one protuberance on one side of each of said screw holes at a predetermined distance apart from said screw hole and another protuberance on another side of said screw hole at a predetermined distance apart from said screw hole, and wherein said protuberances are in pressured contact with said base on both sides of each of said screw holes along the periphery of said hard disk drive, when said cover is fixed onto said base by said screws.

6. A hard disk drive comprising:

a metal base fitted with a hard disk;

a metal cover which covers said hard disk;

a gasket sandwiched between said base and said cover;

screws for fixing said cover onto said base at a plurality of places along the periphery of said cover, wherein protuberances (81 and 82) are provided on said base on both sides of each screw hole provided for accepting each of said screws, there being one protuberance on one side of each of said screw holes at a predetermined distance apart from said screw hole and another protuberance on another side of said screw hole at a predetermined distance apart from said screw hole, along the periphery of said base, and wherein said protuberances are in pressured contact with said base on both sides of each of said screw holes along the periphery of said hard disk drive, when said cover is fixed onto said base by said screws.

* * * * *